H. M. SUTTON AND W. L. AND E. G. STEELE.
PROCESS OF AND APPARATUS FOR PROGRESSIVE ELECTROSTATIC SEPARATION
OF COMMINUTED MATERIAL.
APPLICATION FILED AUG. 19, 1914. RENEWED SEPT. 21, 1920.

1,375,741.

Patented Apr. 26, 1921.
6 SHEETS—SHEET 1

Inventors
Henry M. Sutton,
Walter L. Steele,
Edwin G. Steele.

H. M. SUTTON AND W. L. AND E. G. STEELE.
PROCESS OF AND APPARATUS FOR PROGRESSIVE ELECTROSTATIC SEPARATION
OF COMMINUTED MATERIAL.
APPLICATION FILED AUG. 19, 1914. RENEWED SEPT. 21, 1920.

1,375,741.

Patented Apr. 26, 1921.
6 SHEETS—SHEET 2.

H. M. SUTTON AND W. L. AND E. G. STEELE.
PROCESS OF AND APPARATUS FOR PROGRESSIVE ELECTROSTATIC SEPARATION
OF COMMINUTED MATERIAL.
APPLICATION FILED AUG. 19, 1914. RENEWED SEPT. 21, 1920.

1,375,741.

Patented Apr. 26, 1921.

Inventors
Henry M. Sutton,
Walter L. Steele,
Edwin G. Steele.

H. M. SUTTON AND W. L. AND E. G. STEELE.
PROCESS OF AND APPARATUS FOR PROGRESSIVE ELECTROSTATIC SEPARATION
OF COMMINUTED MATERIAL.
APPLICATION FILED AUG. 19, 1914. RENEWED SEPT. 21, 1920.

1,375,741.

Patented Apr. 26, 1921.

UNITED STATES PATENT OFFICE.

HENRY M. SUTTON, WALTER L. STEELE, AND EDWIN G. STEELE, OF DALLAS, TEXAS.

PROCESS OF AND APPARATUS FOR PROGRESSIVE ELECTROSTATIC SEPARATION OF COMMINUTED MATERIAL.

1,375,741.   Specification of Letters Patent.   Patented Apr. 26, 1921.

Application filed August 19, 1914, Serial No. 857,528. Renewed September 21, 1920. Serial No. 411,811.

*To all whom it may concern:*

Be it known that we, HENRY M. SUTTON, WALTER L. STEELE, and EDWIN G. STEELE, citizens of the United States of America, residing at Dallas, in the county of Dallas and State of Texas, have invented certain new and useful Improvements in Processes of and Apparatus for Progressive Electrostatic Separation of Comminuted Material, of which the following is a specification, reference being had therein to the accompanying drawing.

This invention relates to certain new and useful improvements in a process of and an apparatus for progressive electro-static separation of comminuted material, and is in the nature of an improvement upon the inventions disclosed in patents issued to us, numbered 1,017,701, February 20, 1912; 1,020,063, March 12, 1912 and 1,073,645, September 23, 1913, in which the process of separation consisted in feeding comminuted material composed of particles of different electrical susceptibilities to a support designed to push or propel the material in one direction, and upon which moving electro-static charges were developed; said charges being moved at an angle to the movement of the material in order to separate the particles of a mass by their difference in electric susceptibility; the object of this invention being to provide means for moving the electro-static waves or charges across the line of normal movement of the material upon a support or between two opposing stationary electrodes by so directing and controlling the electric charges, that each bar electrode is charged in succession across the deck and at an angle to the movement of such deck, whereby the difficulties in separating certain classes of comminuted material with moving electrodes are overcome.

In carrying out the process of separating comminuted material as set forth in our prior patents, where the electrode bars move transversely of the table, it was found that when these bars reached a certain speed of travel, the currents of air set up by their movement, interfered with and sometimes totally destroyed, the separative action of the static charges.

In separating comminuted material by electro-static charges with moving electrodes, the speed of travel of the electrodes is adjusted according to the difference in the electrical susceptibilities of the particles to be separated and in separating certain classes of comminuted material, it has been found that in order to make a thorough separation, it is necessary to give the electrode bars a rapid movement across the normal movement of the material upon the support in order to take advantage of the difference in the electrical action of these electrical waves or charges, upon some of the particles of the mass.

In order that this action of the moving electrodes can be clearly understood, suppose that a mixture of iron pyrites and zinc blend of the resin type was being submitted for separation, the pyrites is instantly susceptible to the movement of the static charges because it is opaque to the lines of force of electro-static induction, while the zinc blend, which is a dielectric and is relatively transparent to them and, therefore, is least affected, does not respond to the electrical waves. The pyrites will respond to any reasonable speed of movement of the electrical waves or charges which are moving across the line of normal movement of the mass and the faster the movement of these electrical waves, the more of these pyrites can be removed from a given quantity of material, which enables a greater tonnage of ore to be passed over the machine.

To accomplish a thorough separation with an electro-static separator of the prior construction, the air currents created by the extremely rapid movement of the electrodes also set in motion in the same direction of travel of the electrodes the zinc blend particles which are little, if any, affected by static charges, consequently, both minerals report at the same place at the outer edge of the support or deck and cannot be separately collected.

As another example, suppose it is desired to separate a mixture of iron pyrites like the above, from a black jack zinc blend which has a small amount of iron chemically combined with it, making it partially opaque to the electro-static lines of force and when subjected to a rapid moving charge traveling across the table, the pyrites is moved in the direction of travel of the charge a little faster than the black jack zinc particles, consequently, by the continual application of the moving charges in succession, these minerals can be made to travel in divergent paths over the support so as to allow the particles to be separately collected, which would not be the case if the electrodes were moved, as air currents would be created by the movement of the electrodes traveling in the same direction as the static charges or waves which would destroy the separation.

In the description of the process, the terms electrical opacity and electrical transparency have been used to attempt to describe what apparently takes place during the process of separation, as it has been generally understood by those skilled in the art, in electro-static separation of minerals that where ore pulp is amenable to such a static process, that a separation takes place between the particles of such a mass according to the conductivity of the particles as one or more of the class of particles are good conductors of electricity, while the others are non-conductors.

The conductors acquire instantly, the same potential as the charged surface to which they are delivered and are repelled before the non-conductors have time to become charged, thus admitting of a separate collection. It is also well-known to those skilled in the art, that the reason why conductors are repelled from a charged surface is because they are opaque to the lines of force of an electro-static field and are carried by such lines of force as these lines of force do not pass through such particles, but are confined to their surface in the form of a static charge. The non-conducting particles on the other hand, are transparent to the electro-static lines of force which pass through the particles to the surface upon which they are supported and, therefore, they do not acquire in the same period of time a static charge. When such particles, however, do become charged, they are then just as opaque to the electro-static lines of force and are moved or conveyed by them in the same manner as the conductors, consequently when a mixture of particles that may be composed wholly of non-conductors is allowed to pass for a sufficient length of time over a conveying surface in contact therewith and is subjected to a series of static charges moving transversely of the normal path of the particles, some of the particles either by friction with themselves or with the support on which they are traveling, become electrically charged and are then electrically opaque to the electro-static lines of force and are moved or conveyed by them in the direction in which the charges are traveling, while the non-electrified particles continue in their normal movement unaffected by the static charges.

From the above, it will be seen that the essential feature of this invention, is the provision of a series of stationary electrode bars arranged above a reciprocating table, means being provided for distributing to said bars, electro-static charges in succession which travel across the table in such a manner that the material thereon is moved by the charges in order to perform the separation of the comminuted material delivered upon said table.

We have also found by experimenting that a table constructed in accordance with this invention has a larger capacity and a better separation takes place upon the same, as the mass delivered upon the table is propelled by the movement thereof longitudinally thereon, the more susceptible particles being carried transversely, or approximately so, across the normal movement of the material by the moving electro-static charges.

Another object of the invention is to provide a current distributer or controller for distributing the electro-static charges to the series of bar electrodes in succession, means being also provided for neutralizing and grounding the remaining bars.

Other and further objects and advantages of the invention will be hereinafter set forth and the novel features thereof defined by the appended claims.

In the drawings—

Like numerals of reference refer to like parts in the several figures of the drawings.

In carrying out the construction of an apparatus according to our improved invention, a table is employed constructed substantially in the same manner as disclosed in our prior patents, the following description being given so that the operation can be clearly understood as certain novel features have been incorporated in connection with our prior constructions to improve the general construction of apparatus.

In the drawings, 26 indicates a suitable base frame on which are mounted brackets 27 for vertical adjustment, said brackets being provided with slotted portions 28 mounted upon studs 29 and provided with adjusting screws 30 bearing upon the bars of the frame 26, whereby a vertical movement can be imparted to the brackets in order to adjust the same for the purpose hereinafter described.

The brackets are provided with sockets 31 in which are mounted spring inclined deck supports 32 which have their upper ends connected to depending lugs 33 carried by the deck frame 34 upon which is mounted, the electrically grounded deck 35 constructed substantially the same as disclosed in our prior patents, having an apron 36 surrounding one side and its end, provided with the usual cutting fingers 37.

The deck is also provided with raised edges as clearly shown, for preventing the comminuted material delivered thereon, from being agitated off of the sides, this construction being the well-known form of table now in use.

By mounting the spring support 32 in adjustable socket bearings, the table can be adjusted to any inclination desired either longitudinally or transversely as in some cases, in separating certain grades of ore, it is necessary that the discharge end be higher than the delivery end to check the too rapid movement of the pulp over the table so as to subject the mass to the proper agitation.

In order to provide means for reciprocating the table to propel the material longitudinally thereon and at the same time to agitate the material being delivered upon the table so as to cause the same to spread out in order to allow the particles thereof to be subjected to the electro-static charges, a pitman rod 38 is connected to one of the lugs to which one of the supports is connected, this connection being preferably adjustable as clearly shown, whereby the length of the pitman rod in relation to the table can be increased or decreased.

The opposite end of the pitman rod 38 is connected to an eccentric strap 39 by an adjustable joint 40, the object of this eccentric being to oscillate the electrically grounded deck longitudinally; the movement of oscillation being adjustable by providing the shaft 41 with a fixed eccentric 42 and an adjustable eccentric 43, the shaft being driven by a pulley 44 over which passes a belt 45 from a change-speed mechanism of the same construction as disclosed in our above-mentioned prior patents. It will thus be seen that by adjusting the relative position of the two eccentrics, any desired stroke can be imparted to the grounded deck and in addition to the longitudinal stroke imparted by the eccentric head motion, the deck is given a slight rising and falling motion by means of the inclined supports; the deck rising on its forward stroke and falling on its return stroke, which agitates and imparts to the granular pulp delivered upon the deck, a movement of travel longitudinally along the deck. When the material is delivered upon the deck and the table is in movement, projecting pulsations are imparted to the pulp which besides advancing it along the table in the desired direction, also agitates the pulp in order to allow the electrical waves or charges to have full action upon the particles thereof whereby a better separation of the susceptible particles of the mass from the non- or partially susceptible particles is obtained, and this differential reciprocation is obtained through the head motion and the supporting springs.

Arranged at the head of the table, is a suitable support carrying a feed hopper 46 which is provided with an inclined feed pan connected by a pitman rod 47 to an eccentric 48 mounted on a shaft 49 which is driven by a belt 50 traveling over a pulley fixed on said shaft, which allows the material to be evenly distributed upon the deck. It is, of course, understood that various other forms of feeding mechanism could be employed, the main object to be obtained being to provide means for distributing the comminuted material upon said deck in a thin stream so as to allow the movement of the deck to cause the material to spread and to travel longitudinally thereon by the propelling movement thereof whereby the particles are in such a position upon the deck that the electric charges have free access thereto.

Figure 2:
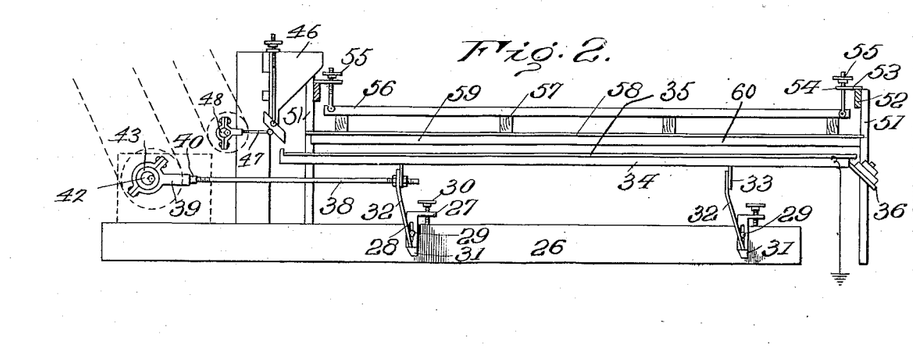
Fig. 2, is a longitudinal section through the apparatus showing the means for mounting the grounded deck and for imparting movement thereto.
Figure 3:
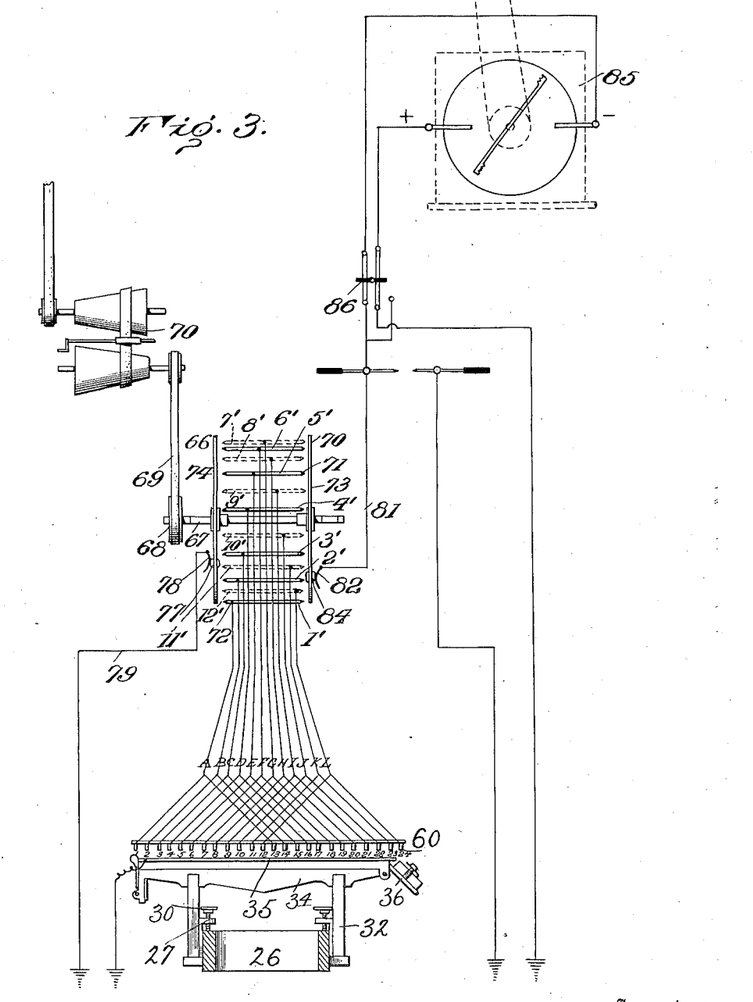
Fig. 3, is a transverse section through the apparatus showing the electrical connections of the bar electrodes to the distributer or controller.
Figure 4:
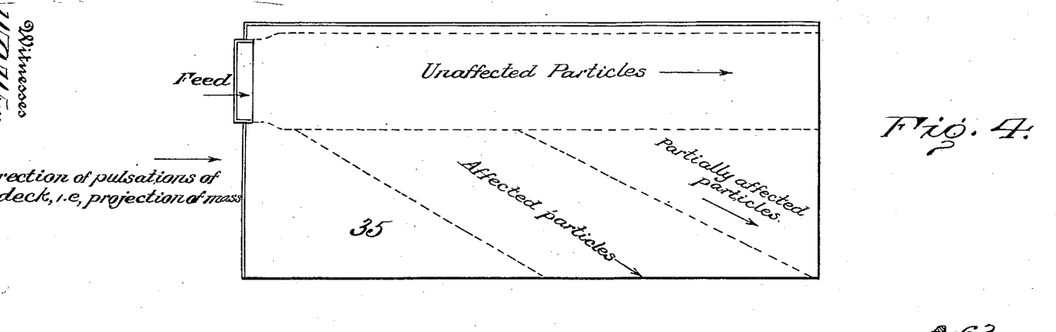
Fig. 4, is a plan view of the deck showing approximately, the position of the zones of affected and unaffected material thereon.

Arranged at each end of the table 26 is a pair of standards 51 which are connected together by cross bars 52 provided with laterally extending brackets 53 having suitable openings in which are mounted suspension bolts 54 provided with hand nuts 55 at their upper ends for adjusting the bolts vertically within the brackets as clearly shown in Fig. 2. These bolts are connected at their lower ends to a frame 56 to the under side of which are connected insulating blocks 57 carrying a wooden base 58 which is preferably formed of dry baked wood varnished to keep out the moisture, but it is, of course, understood that any other insulating material could be employed; the object being to provide an insulated base for the purpose of insulating the electrodes from the supporting frame 56, as will be hereinafter described.

Connected to the under side of the base 58 are ribbed strips 59 having their edges in contact with one another and to which the electrode bars 60 are fastened. The preferred form of constructing the electrode bars 60 is to secure to each of the ribs 61 of the strips 59, a substantially U-shaped trough 62 preferably formed of micanite which is composed of sheets of mica held together by a binder of suitable insulating material; these U-shaped troughs being connected to the ribs by a good insulating adhesive or in any other desired manner.

Figure 6:
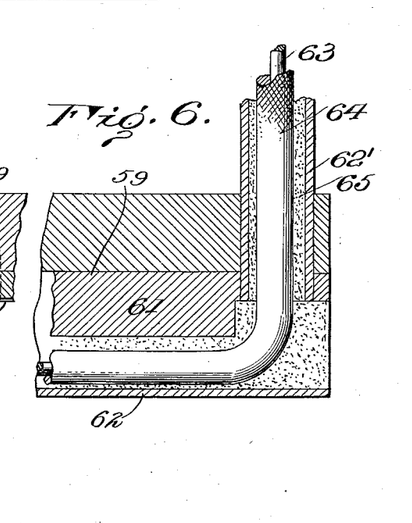
Fig. 6, is a detail longitudinal section showing the terminal of one of the electrodes.

Communicating with the troughs at one end, are insulating sleeves 62' which extend up through the base 58 and the respective strips 59 as clearly shown in Fig. 6. Extending through each of these insulating sleeves 62', is a metallic electrode 63 which is incased in a high insulating medium 64, an ordinary rubber-covered wire of highly insulated material being preferably employed, these wires being extended into the trough for the entire length thereof and after they have been arranged in position, they are hermetically sealed therein by a good insulating wax as shown at 65, which is poured into the trough from one end or through the insulating sleeve 62', the wax entirely surrounding the wire or metallic electrode so as to form a thorough insulation. This is essential in order to carry out the process of electro-static separation as ordinary electrically insulated wire, is insufficient to withstand the strain of an electro-static charge when the same is confined with such a high degree of tension or pressure as is necessary in electro-static separation of various elements as disclosed in the process being described.

In carrying out the process of separating ore according to the process set forth in this application, it is essential to provide an electrode bar having insulations of sufficient dielectric strength as to confine the static charge to the metallic electrode as an insulation of the ordinary kind would allow such static charge to filter through the insulation in the form of convective charges or the insulation would become entirely useless and the charge would pass off of the conductors instantaneously in the form of sparks to the opposing electrode of the surface and in either case such an action of the charge is detrimental to the successful operation of separating comminuted material, as it is essential to maintain the charge on the electrode at a known density which is regulated according to the material being treated.

The strips 60 are preferably secured to the base by screws as clearly shown, but it is, of course, understood that they can be secured by any desired means and while we have shown the base and strips formed of separate pieces, by employing a good insulating material, the base could be formed with ribs to which the troughs could be connected to receive the metallic electrodes which form the complete electrode bars. This construction of electrode bars has been found in practice, to withstand the high tension of electro-static stress and the manner of constructing the same is exceedingly simple and cheap.

Figure 1:
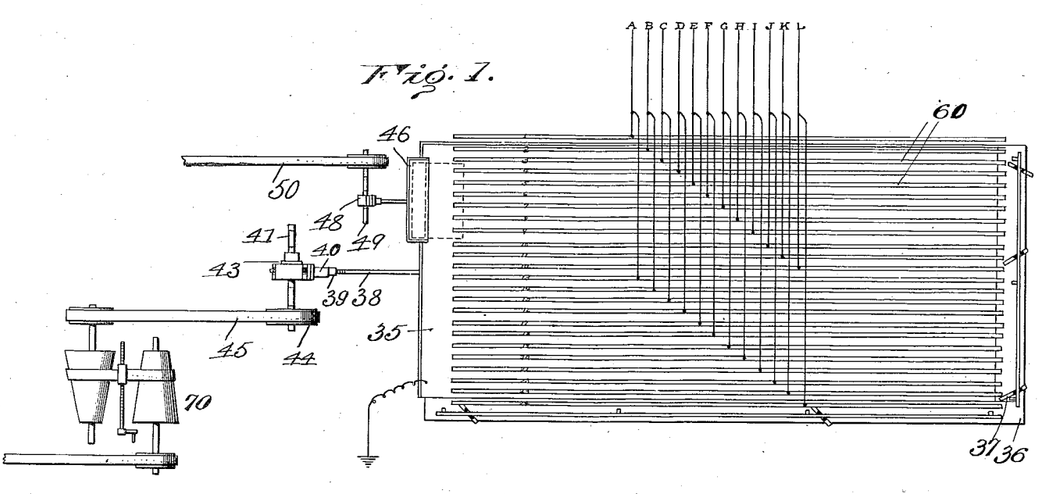
Figure 1, is a plan view of our improved apparatus for carrying out the process of separating comminuted material with stationary electrodes, the circuit wires being shown for convenience in illustrating the apparatus, connected with the center of the electrodes.
Figure 5:
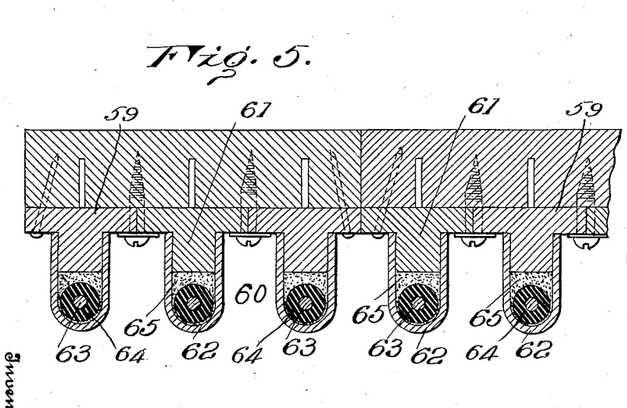
Fig. 5, is an enlarged detail transverse section of a series of electrode bars showing the manner of constructing and mounting the same.

Connected to the free ends of the metallic electrodes or wires are a series of conductors A, B, C, D, E, F, G, H, I, J, K and L, which in Fig. 1, are shown for convenience, connected to the center of the metallic electrodes. The preferred form of constructing the electrode bars and the provision of means for connecting the same to the conductors is shown in Figs. 5 and 6 and while various other means and manners of connecting the electrode bars to the conductors could be employed, the form shown in detail, has been found to be very satisfactory in operation. However, we do not wish to limit ourselves to any details of construction and manner of connecting the bars, the essential feature to be accomplished, being to provide an electrode bar formed with a central metallic electrode surrounded by a high insulated material in order to obtain a static charge upon the comminuted material being separated upon the table.

The electrical conductors A, B, C, D, E, F, G, H, I, J, K and L are connected at their opposite ends to distributer bars 1', 2', 3', 4', 5', 6', 7', 8', 9', 10', 11' and 12' of a distributer 66 which comprises a central axle or shaft 67 carrying a pulley 68 over which passes a belt 69 extending from a change-speed mechanism 70 of the well-known construction now in use and clearly described in our prior patents mentioned above, by means of which the speed of the shaft 67 can be quickly regulated.

The distributer bars 1', 2', 3', 4', 5', 6', 7', 8', 9', 10', 11' and 12' are composed preferably of metal and are mounted in a suitable fixed insulated support, not shown, said bars being provided with pointed ends 71, the connection of the conductors to these bars being shown at 72 but it is, of course, understood that these conductors can be connected at any desired point.

Mounted on the central axle or shaft of the distributer is a pair of spaced disks 73 and 74, the disk 74 being provided with four metallic sectors 75 which are connected by a metallic conductor 76 with a metallic contact ring 77 having a metallic brush or wiper 78 in contact therewith; said brush or wiper having a ground wire 79 as clearly shown.

The opposite disk 73 is provided with four sectors 80 and is constructed substantially in the same manner as the disk 74 with the exception that the conductor 81 leading from the contact brush 82 which is in contact with the metallic ring 84 which in turn is connected to the sectors by conductors 83, is connected to either pole of the electrostatic generator 85 through a reversing switch 86 to admit of the current being switched from either pole of the generator to the electrode bars through the distributer.

The construction of generator and connection is clearly shown in our prior Patent #1,073,645, granted September 23, 1913, the only difference being that the distributer is placed between the electrodes in order to distribute the electro-static charges from the generator to the proper electrode bars so as to obtain a succession of charges passing transversely across a supporting deck.

The distributer disks 73 and 74 are formed of good insulating material and are fixed on the shaft 67 by providing the same with the usual form of hubs employed in constructing generators. The sectors on the disk 73 are out of transverse alinement with the sectors on the disk 74, or are opposite intermediate points of the sectors of the opposing disks or vice versa, this being accomplished by mounting the disks upon the shaft in adjusted position in respect to each other.

The distributer bars 1', 2', 3', 4', 5', 6', 7', 8', 9', 10', 11' and 12' have their pointed ends placed as close as possible to the metallic sectors on the disks 73 and 74, just sufficient clearance being left to permit the disks to rotate without coming into contact with the distributer bars, the static charges passing by convection from off of these bars to the sectors of the disk.

Figure 12:
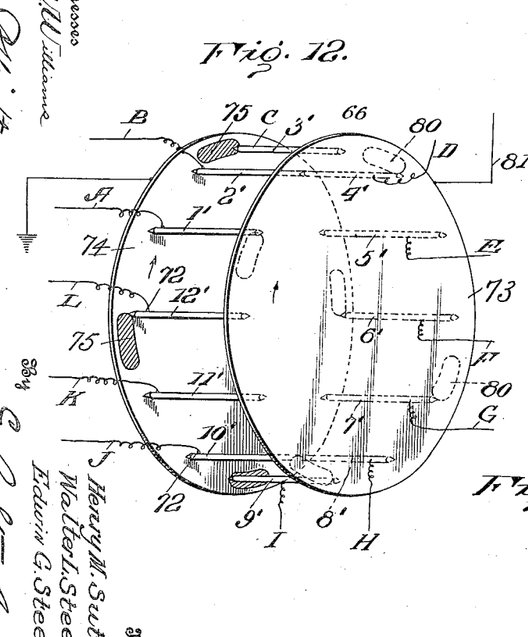
Fig. 12, is a perspective of the distributer or controller showing the position of charging and grounding.
Figure 13:
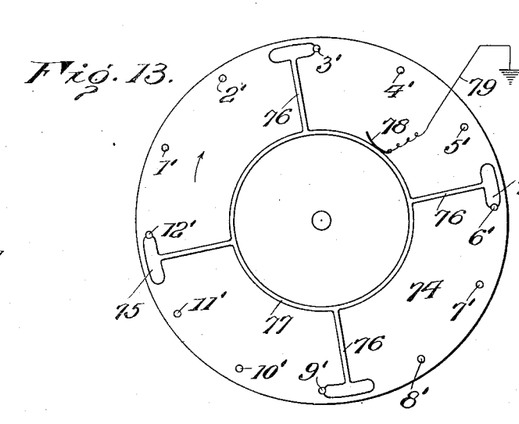
Fig. 13, is a plan of one of the controlling disks and the ground connection.
Figure 14:
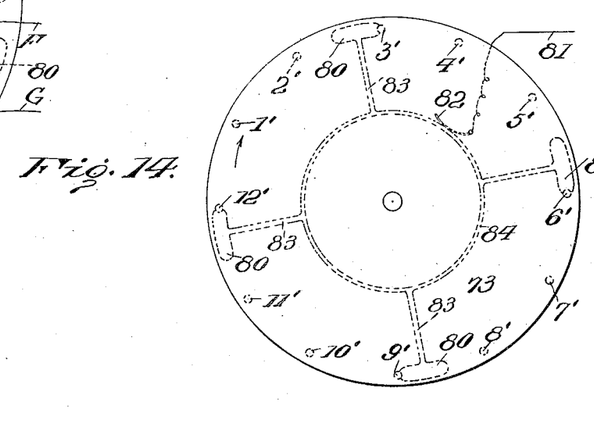
Fig. 14, is a perspective of the other controller disk with the generator or charge connection.

In the drawings, the position of the distributer disks 73 and 74 is such that a charge is being delivered to the contact ring 84 through the wire 81 and the contact brush 82 and by referring to Fig. 12, it will be seen that the distributer bars 1', 4', 7' and 10' are receiving their charges from the sectors 80 on the disk 73.

Figure 7:
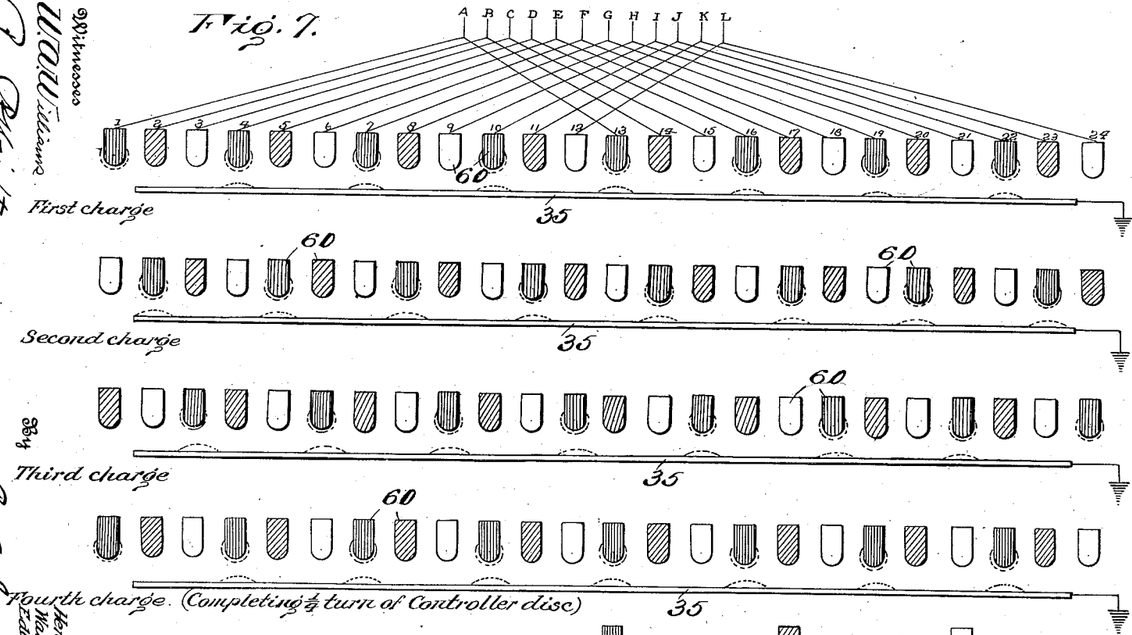
Fig. 7, is a diagram showing the position of the charged and the grounded electrodes on each movement of the distributer.

The current then flows into the wires A, D, G, and J, each of which, have branches as shown, so that when A is receiving a charge, electrode bars 1 and 13 are charged simultaneously which is clearly illustrated in Fig. 7 and when D is charged, 4 and 16 are charged simultaneously and so on with the remaining two conductors G and J which are connected, respectively, to the electrode bars 7—19 and 10—22.

The bars are charged with one-twelfth of a revolution of the distributer disk as the electrode bars 1—13, 4—16, 7—19 and 10—22 receive a static charge on this movement of the distributer. In the next twelfth of a revolution of these distributer disks the electrodes 1—13, 4—16, 7—19 and 10—22, are grounded through the same distributer bars and sectors 75, as shown in Fig. 7 and simultaneously, a second charge is delivered to the electrode bars 2—23, 5—20, 8—17 and 11—14 through the distributer bars 2', 5', 8', 11' and conductors B, E, H and K, which is clearly shown in Fig. 7 and it will be noticed that these last mentioned distributer bars are grounded when the controller disks are turned one-twelfth of a revolution; the metal sectors on the disk 74 which are grounded, drawing off these charges from these electrode bars to the earth as they arrive opposite the distributer bars.

As the electrode bars 2—23, 5—20, 8—17 and 11—14 are grounded, the electrode bars 3—24, 6—21, 9—18 and 12—16 simultaneously receive their charge through the conductors C, P, I and L from the distributer so that in one-fourth of a turn of the distributer disk, every electrode bar has received a charge and by repeating or completing the revolution of the disk, the electrode bars receive four charges in every complete revolution thereof.

It will be noted that by this arrangement of connecting the electrode bars to the distributer bars and employing distributing disks as shown, that when the third charge is delivered the electrode bar 1 is neutral, being the first neutral bar to appear on the starting side of the table in the direction in which the charges are moving, and as shown in Fig. 7, the charges progress across the deck of the table and electrode bars are intermittently charged and grounded by the distributer.

By constructing a distributer and connecting the same in this manner, eight bars are charged at once, which avoids the use of a large number of wires leading from the distributer and as the distributer disks are rotated one-twelfth of a revolution, eight of the twenty-four electrode bars are charged at once and on the next movement of the distributer disk, the next eight lying adjacent thereto and in advance of the previously mentioned bars, are charged which has the identical effect on the material as if the electrode bars were all charged one after the other across the entire deck and followed by grounded and neutral bars.

Figure 8:
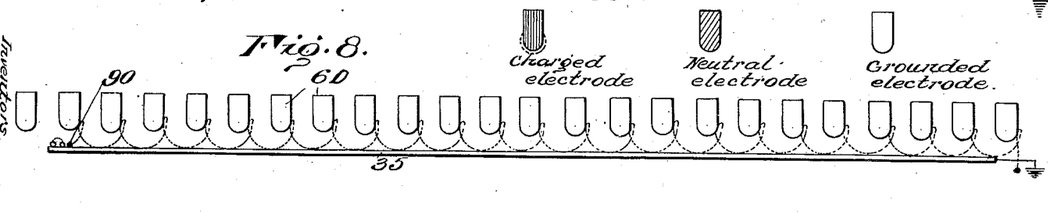
Fig. 8, is a transverse section through the deck and electrode, showing the travel of the affected and unaffected particles during the movement of the electrical waves or impulses across the deck.
Figure 9:
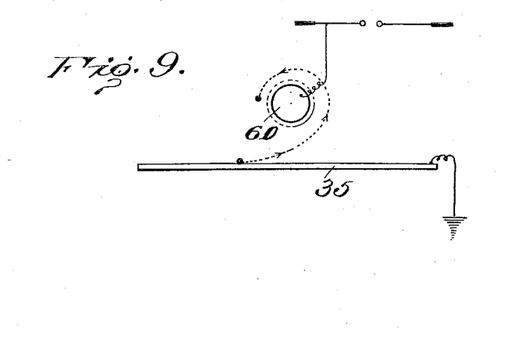
Fig. 9, shows the travel of an affected particle around a round electrode bar.
Figure 10:
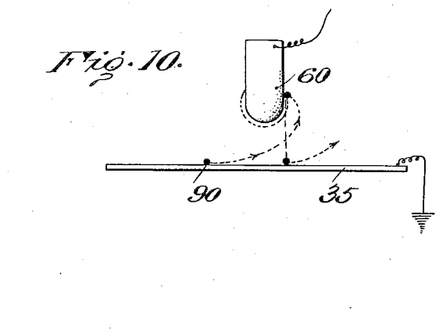
Fig. 10, is a diagram showing the travel of an affected particle to a charged electrode bar constructed in accordance with our invention, the position of the particles in their forward movement being also illustrated when the electrode has been grounded.
Figure 11:
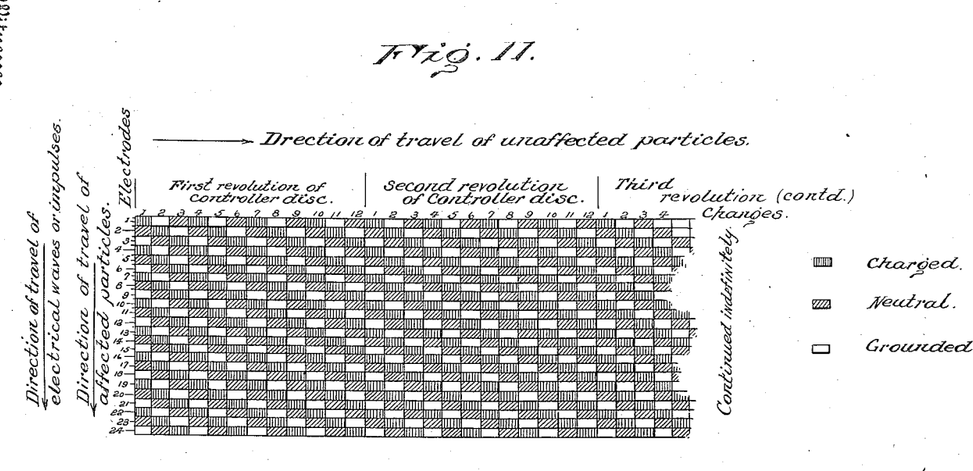
Fig. 11, is a diagram showing the progression of charges across the deck; said charges being followed by grounds as shown, the electrical impulses or waves moving transversely to the movement of the unaffected particles.

By experimenting with various forms of electrode bars, we have found that better results can be obtained by constructing a bar as herein shown and described in order to progress the affected particles transversely across the table as when a round electrode bar as shown in Fig. 9 is employed, the particle affected thereby is attracted and assumes a spiral path around the bar and in some instances, gravitates several times around the electrode bar before striking the deck. With a bar constructed as herein shown and described, the particle affected by the electrode bar attempts to gravitate around the bar, but owing to the construction thereof, strikes the side of the electrode bar and drops vertically, this action being repeated when the next succeeding bar is charged and in Fig. 8, we have shown a complete line of travel of the affected particles 90 transversely of the table.

In Fig. 7, we have shown in dotted lines, the approximate position of a static charge on the bar and at the same time, have illustrated the approximate area on the deck which is charged inductively.

In carrying out the process of separating comminuted material upon an apparatus as previously described, when the apparatus is in operation and the generator is delivering a series of electro-static charges to the electrode bars through the distributer, the comminuted material which is being propelled longitudinally upon the table, is separated as clearly set forth in our prior patents as the electro-static charges or waves through the medium of the distributer, travel transversely of the table so as to cause the particles affected by the charges to be moved in lines deviating from the lines of normal movement and in such a manner that the creation of any air currents by the movement of said charges is obviated and a separator is formed which is able to separate comminuted material of all kinds at a high rate of speed.

From the foregoing description, it will be seen that we have provided an apparatus by means of which, the process of electro-static separation can be accomplished, employing a series of stationary electrodes mounted for vertical adjustment in respect to the deck by means of which, the comminuted material is separated according to its electrical susceptibilities, the material passing between two opposing electrodes, the bar electrodes of which, are successively energized and de-energized to cause a series of electro-static charges to move transversely of the deck and while we have shown and described the electrode bars being charged in such a manner that the immediate bar behind the previously charged one is grounded, this is not essential as a portion only of a static charge could be removed from the electrode bar immediately behind the charged one and still leave the process operative, as it is only necessary that one of the charged electrode bars be at a higher electrical potential than the other bars.

By employing a distributer as shown and described, the bar electrodes are charged eight at a time in succession across the series of bars so as to produce a series of electro-static charges moving across the normal movement of the material in order to separate the particles of comminuted material delivered thereon according to their electrical susceptibilities regardless of the nature of such particles, the electro-static charges attracting the particles as the bar electrodes are energized and releasing said particles as the bar is deënergized, the movement of the particles being clearly shown.

While we have shown and described a peculiar form of apparatus for carrying out this process, various other forms of apparatus could be employed and in fact, by providing any one of the apparatus shown in our prior patents with a distributer as disclosed in this application, the process of separating comminuted material could be carried out successfully, as the electrical action upon the particles in this case, is precisely the same as that which occurs in our patents. The main novelty of this invention is in the provision of a series of stationary electrodes connected to a generator through a distributer by means of which, a series of successively electro-static charges are established upon a support to cause the particles to be attracted thereby in lines deviating from the line of normal movement of the mass of particles upon the support, without creating any air currents which would affect the particles of the mass.

We claim:

1. The process of separating comminuted material according to the electrical susceptibilities of the particles thereof, consisting in subjecting successively the material to be separated to a series of electro-static charges moving independent of their seats of energy, and separately collecting the thus separated particles.

2. The process of separating comminuted material, consisting in imparting a normal movement to the material upon an electrode surface, progressively directing a series of electro-static charges of equal density moving independent of their seats of energy upon said material to cause said particles differentiated according to their electrical susceptibilities, to travel in lines deviating from the line of normal movement of the material, and separately collecting the thus separated particles.

3. The process of separating comminuted material, consisting in imparting a normal movement to the material upon a support, progressively establishing electro-static charges upon the support moving independent of their seats of energy across the line of normal movement to cause the different components to travel according to their electrical susceptibilities in lines deviating from the line of normal movement, and separately collecting the thus separated particles.

4. The process of separating comminuted material, consisting in imparting a normal movement to the material in one direction, intermittently moving the particles of said material by a series of electro-static charges of equal densities moving independent of their seats of energy according to their electrical susceptibilities, in lines deviating from that of the normal movement, and separately collecting the thus separated particles.

5. The process of separating comminuted material, consisting in supporting and imparting a normal movement to said material, submitting the particles thereof of different electrical susceptibilities intermittently to the separating action of a series of electro-static charges successively moving independent of their seats of energy in planes approximately transversely to the line of normal movement of the material, and separately collecting the thus separated particles.

6. The process of separating comminuted material, consisting in supporting a mass of material upon an electrode surface, imparting an impulse to said material in one direction, directing upon said material successively a series of electro-static charges moving independent of their seats of energy in paths across the impulse movement of said material, to cause the particles to be separated according to their different electrical susceptibilities.

7. The process of separating comminuted material, consisting in imparting a normal movement to the material in one direction upon a support, moving the particles of said material intermittently according to their electrical susceptibilities in lines deviating from that of the normal movement, by a series of successively acting electro-static charges of equal densities moving independent of their seats of energy in lines deviating from the line of normal movement of the material, and separately collecting the thus separated particles.

8. The process of separating comminuted material, consisting in imparting an impulse to said material in one direction, subjecting said material to a series of electro-static charges of equal electro-static stress, moving successively independent of their seats of energy in lines moving across the line of normal movement of the material, to cause the particles of said material to move in lines deviating from that of the normal movement, and separately collecting the thus separated particles.

9. The process of separating comminuted material, consisting in imparting a normal movement to the material upon its support, establishing upon said support a series of electro-static charges moving successively independent of their seats of energy across the support and of equal densities, to impart a movement to the more susceptible particles in a direction across the normal movement of said particles, and separately collecting the thus separated particles.

10. The process of separating comminuted material, consisting in supporting a mass of material upon an electrode surface, imparting an impulse to said material in one direction, directing upon said material a series of electro-static charges moving successively independent of their seats of energy, and separately collecting the thus separated particles.

11. The process of separating comminuted material, consisting in imparting a normal movement to the material upon a support in one direction, subjecting said material to a series of electro-static charges moving independent of their seats of energy in lines across the normal movement of the material, to cause the particles of said mass according to their electrical susceptibilities, to move in lines deviating from the line of normal movement intermittently, and separately collecting the thus separated particles.

12. In an electro-static separator, an oscillatory supporting table, a series of spaced stationary electrodes arranged above said table, and means for successively energizing and deënergizing said electrodes.

13. In an apparatus for separating comminuted material, the combination with means for moving such material in a predetermined normal path, a series of bar stationary electrodes arranged for establishing a series of electro-static charges of equal densities successively across the normal path of travel of said material, means for energizing said bar electrodes in series, and means for deënergizing said bar electrodes.

14. In an electro-static separator, the combination with a pair of opposing stationary electrodes, means for propelling material between said electrodes, and means for energizing and deënergizing one portion of said electrodes in a series successively.

15. In an electro-static separator, the combination with an electrode surface, of a series of stationary bar electrodes mounted for vertical adjustment above said supporting surface, means for oscillating said electrode supporting surface, means for delivering comminuted material upon said surface, means for successively energizing and deënergizing said electrode bars in series, and means for separately collecting the thus separated particles.

16. In an electro-static separator, the combination with a reciprocating electrode surface, of a series of stationary bar electrodes arranged above said surface, means for energizing said bar electrodes in series, and means for deënergizing said bar electrodes in series.

17. In an electro-static separator, the combination with a supporting surface, of means for imparting movement to said surface to cause the particles delivered thereon to move longitudinally upon said surface, stationary bar electrodes arranged above said support, and means for energizing and deënergizing said bar electrodes progressively in series.

18. An electro-static separator, the combination with a supporting surface, of a series of stationary bar electrodes arranged above said supporting surface, means for energizing said bar electrodes successively to produce a traveling field of electro-static force moving in lines deviating from the line of normal movement of the material upon said surface, and means for collecting the thus separated particles.

19. An electro-static separator, having an electrode supporting surface provided with means for adjusting the inclination thereof longitudinally and transversely, an electrode bar supporting frame arranged above said supporting surface, means for adjustably suspending said frame, a series of stationary electrode bars carried by said supporting frame, and means for energizing said bars successively in series to produce a traveling field of electro-static force.

20. An electro-static separator comprising a supporting surface, having a series of stationary bar electrodes mounted for vertical adjustment in respect to said surface, a generator, a distributer in circuit with said generator, conductors extending from said distributer to said electrode bars, and means for grounding said electrode bars in series.

21. In an electro-static separator, the combination with an adjustable supporting surface, of a series of stationary electrode bars arranged above said supporting surface, means for adjusting said bars vertically in respect to said supporting surface, and means for energizing said bars successively in series extending transversely across said supporting surface to produce a traveling field of electro-static force.

22. The progressive process of separating comminuted material, consisting in supporting said material upon an electrode supporting surface, propelling said material upon said surface, directing upon said material successively, a series of electro-static charges moving independent of their seats of energy across the normal movement of the material in series, and separately collecting the thus separated particles.

23. The process of separating comminuted material consisting in imparting a normal movement to the material upon an electrode surface, successively directing independent of their seats of energy a series of electro-static charges upon said material to cause the particles of said material differentiated according to their electrical susceptibilities, to travel intermittently in lines deviating from the line of normal movement of the material, and separately collecting the thus separated particles.

24. The process of separating comminuted material consisting in imparting a normal movement to the material upon a support, successively directing independent of their seats of energy a series of electro-static waves upon said material in series traveling across the normal movement of the material, to cause the different components of said material, to travel according to their electrical susceptibilities intermittently in lines deviating from the line of normal movement, and separately collecting the thus separated particles.

25. In an electro-static separator, the combination with an electrode supporting surface, of means for feeding and imparting longitudinal movement to the material delivered upon said surface, a series of stationary bar electrodes mounted above said surface for vertical adjustment, means for successively energizing said bar electrodes in series extending transversely across said support, and means for collecting the particles separated by the charges delivered to said bar electrodes from said surface.

26. In an electro-static separator, the combination with an electrode supporting surface, of means for feeding and imparting movement to the material delivered upon said surface, a series of stationary electrode bars arranged above said surface, and means for energizing said bars successively in series extending transversely of said supporting surface.

27. The process of separating comminuted material according to the electrical susceptibilities of the particles thereof, consisting in feeding the material in a normal path and subjecting the material to be separated to a series of electro-static waves successively, moving unidirectionally across the normal movement of the material independent of their seats of energy, and separately collecting the thus separated particles.

28. In an electro-static separator, the combination with an electrode supporting surface, of means for reciprocating said surface, to cause the particles delivered thereon, to move longitudinally upon said surface, a series of bar electrodes arranged above said supporting surface, a generator, and a distributer having a connection with said bar electrodes for energizing and de-energizing said bar electrodes successively in series extending transversely across said support.

29. In an electro-static separator, the combination with a table having an electrode supporting surface, of means for feeding comminuted material upon said surface, means for imparting a movement to said table for propelling the material delivered thereon longitudinally thereof, a series of bar electrodes arranged above said supporting surface, a generator, a distributer connected to said generator, said distributer having a connection with said electrode bars for energizing and grounding said bars successively in series extending transversely of said deck.

30. The process of separating comminuted material consisting in imparting a normal movement to the material upon an electrode support, progressively directing a series of electro-static waves upon said material, moving independent of their seats of energy in lines deviating from the lines of normal movement of said material, to cause the different components of said material to travel according to their electrical susceptibilities intermittently in lines deviating from the line of normal movement, and separately collecting the thus separated particles.

31. An electro-static separator, having an electrode supporting frame provided with a base formed of insulating material, ribbed strips secured to the under side of said base having contacting edges, inverted U-shaped insulating troughs arranged over the ribs of said strips and depending therefrom, insulated electrodes arranged within said troughs and insulating material surrounding said electrodes within said troughs.

32. An electro-static separator, comprising an electrode supporting frame having an insulated base, a series of strips secured to the under side of said base provided with parallel ribs, inverted U-shaped troughs arranged over the ribs of said strips, said base having a vertical opening communicating with each trough at one end thereof, an insulating sleeve arranged within said opening, an insulated electrode passing through said sleeve into said trough, and insulating material surrounding said electrode within said sleeve and trough.

In testimony whereof we hereunto affix our signatures in the presence of two witnesses.

HENRY M. SUTTON.
WALTER L. STEELE,
EDWIN G. STEELE.

Witnesses:
E. E. HURT,
JNO. I. WITT.